Nov. 12, 1968     G. REUSCH     3,410,194
VENTING STRUCTURE FOR ROOFS AND THE LIKE
Filed Dec. 7, 1967

INVENTOR.
GOTTHILF REUSCH
BY
McGlew & Toren
ATTORNEYS

United States Patent Office 3,410,194
Patented Nov. 12, 1968

3,410,194
VENTING STRUCTURE FOR ROOFS
AND THE LIKE
Gotthilf Reusch, Berkheim, near Esslingen, Germany,
assignor to J. Eberspacher, Esslingen (Neckar),
Germany
Continuation-in-part of application Ser. No. 532,715,
Mar. 8, 1966. This application Dec. 7, 1967, Ser.
No. 688,948
Claims priority, application Germany, Mar. 30, 1965,
E 28,994
12 Claims. (Cl. 98—42)

ABSTRACT OF THE DISCLOSURE

A venting structure for a roof is formed of an opening in a roof, a cover for the opening, and variably positionable sidewalls for regulating the flow of air through the opening. The cover is movably displaceable from the opening. The sidewalls are mounted on the roof adjacent the opening and are selectively movable upwardly and downwardly for varying the air flow conditions at the opening in the roof when the cover is displaced from the opening.

Summary of the invention

This application is a continuation-in-part of applicant's earlier filed copending application, Ser. No. 532,715 filed Mar. 8, 1966, now abandoned.

This invention relates, in general, to the construction of roofs for ventilators, buildings and the like, and in particular, to a new and useful device for space aeration which includes a roof or a similar construction having an opening which is closed by displaceable cover member and which further includes side wall forming elements adjacent the cover which may be selectively moved upwardly and downwardly for varying the air flow conditions through the opening in the roof when the cover member is displaced from it.

The invention is an improvement over prior art aeration devices, principally in that the covering for the opening in the roof and the adjacent side walls may be selectively positioned relative to the roof for varying the air venting conditions. In this manner, it is possible to obtain optimum suction output of air in dependence upon the wind incidence range acting on the roof structure. The roof device of the invention is adaptable to the changing wind conditions and may be arranged such that an optimum air suction is always effected.

In accordance with the invention, the roof structure includes means for elevating and lowering a covering for an opening in a roof and further includes side wall elements which are either flexible or hingedly constructed so that they may be moved upwardly and downwardly on each side of the roof covering. In one arrangement, the roof covering may be adapted to move simultaneously with the sidewall structures, or the sidewall structures may be moved independently for selectively varying the air flow conditions through the space between the covering and the roof opening. In a still further embodiment of the invention, the sidewalls adjacent the adjustable roof cover may be made of a flexible material so that they may be bent to provide the desired air and wind flow conditions.

Accordingly, it is an object of the invention to provide an improved roof construction with means for facilitating the aeration or ventilation of the structure with which it is associated, which comprises a movable cover and at least one sidewall associated with the roof which may be raised upwardly and lowered in respect to the roof for varying the air-deflecting area when the cover is displaced from the roof.

A further object of the invention is to provide a roof structure which includes means for variably positioning a cover for a roof opening to adjust the output area of the opening in the roof and which further includes wall means on each side of the cover which may be moved upwardly or downwardly for varying the aeration conditions through the opening.

A further object of the invention is to provide a roof structure having means for automatically positioning a roof cover, and sidewalls associated therewith for varying the air flow through a roof opening which may be closed by the cover.

A further object of the invention is to provide a roof structure which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

General detailed description of the preferred embodiments

Figures 1A, 1B:
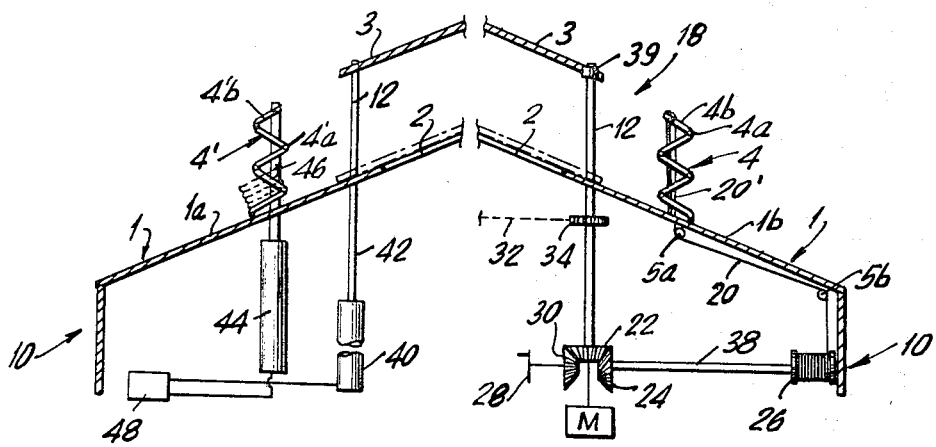
FIGS. 1a, 1b are partial transverse sectional views of a building constructed in accordance with the invention.

Referring to the drawing in particular, the invention embodied therein, as indicated in FIGS. 1a, 1b, comprises a building structure generally designated 10 having a roof 1 with sloping sides 1a and 1b each having a portion of an air venting slot or opening 2 adjacent the upper end or peak thereof.

In accordance with the invention, the opening 2 of the roof 1 is closed by a cover element or member 3 which, as shown in FIG. 1a, may be moved upwardly and downwardly in respect to roof 1 on guide member 12. The cover member 3 can be moved vertically such as by a handwheel 28 or by motor M or other similar means in order to either open or close the slot opening 2 and to adjust the flue opening area between each side or edge of the cover element 3 and the slot 2 opening into the building 10, as indicated by the arrow 18.

In a preferred arrangement of the invention there is provided at least one sidewall-forming member or wind and air control wall 4, 4' disposed on the roof 1 alongside the opening 2. Each includes, in the embodiments of FIGS. 1a and 1b, individual plastic tile or panel members 4b, 4'b, which are hingedly connected together at 4a, 4'a. The wall 4 is spring biased into its upwardly extended position and may be raised and lowered by means of a supporting cable 20 which is attached to the upper panel 4b. The wall 4, 4' may be selectively arranged in the fully lowered position, shown dotted in FIG. 1b, in the fully raised position or in any other position intermediate these limits.

In the embodiment illustrated, the cable 20 may be moved under the control of a motor M driving through beveled gears 22 and 24 to rotate a drum 26 to wind the cable thereon which is connected to the rod 20' to either raise or lower the wall. The cable 20 is guided over pulleys 5a and 5b between the drum 26 and the wall 4. The hand wheel control 28 may be employed instead of the motor M for driving the gear 22 through a beveal gear 30. In a similar manner, the hand wheel 28 or the motor M may be used to raise and lower the guide members 12. A drive arrangement as shown in FIG. 1a for the guide member 12 may be employed for each of the other guide members (not shown) supporting the cover member 3. Alternatively, the guide member opposite guide member 12 may be driven through a chain 32 from the rotation of a sprocket 34 on the guide member 12 to drive a sprocket on the opposite guide member. Suitable disconnecting means (not shown) on the rod 12 and on the shaft 38 are provided to cut out one of these elements to permit only raising or lowering of the cover member 3 alone or the wall 4 alone. A nut 39 is rotatably secured to the cover member 3 and mounted on the guide member 12 for raising and lowering the roof in response to the guide member.

In place of the means for positioning the cover member 3 shown in FIG. 1a, a hydraulic piston cylinder 40 and extendible arm 42 can be used for raising and lowering the cover member; see FIG. 1b. In addition another hydraulic piston cylinder 44 and extendible arm 46 may be utilized for selectively positioning the wall 4'. These hydraulically driven means may be individually or jointly operated from a control panel 48. Preferably a piston cylinder would be located at each end of the cover member 3, and the wall 4' for the raising and lowering operations.

Thus, the above-described arrangements provides means for varying the height of the cover member 3 above the roof structure 1 and also for varying the height of one or more sidewall elements 4 which are arranged on each side of the slot or opening 2 to adjust the inward air flow or outward air flow conditions.

Figure 2:
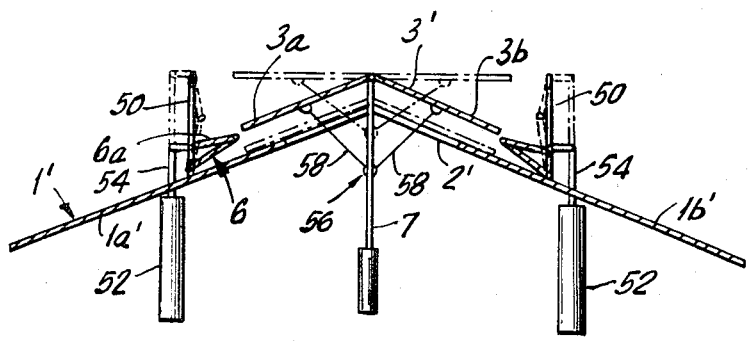
FIG. 2 is a view of a roof generally similar to the arrangement in FIGS. 1a, 1b illustrating another embodiment of the invention.

In FIG. 2, there is indicated a roof 1' similar to the other embodiment having a peak slot or opening 2' extending along a substantial portion of its length which may be closed or opened in varying amounts by a cover member 3'. In this embodiment, the cover member 3' is carried by a member or pole 7 permitting its vertical adjustment for varying the height of the cover member 3' above its closed position, shown dotted, on the roof 1'. The pole 7 is telescopically arranged for movement of the cover member 3' between its position closing the opening 2' in the roof 1' and its upper horizontal position shown in the chain lines. The pole 7 may be moved vertically by hydraulic means, not shown, or other means known in the art. When the pole 7 is extended into its upper position the opposite sides 3'a, 3'b of the cover member 3' are still in a sloping position as shown in full lines in FIG. 2. By displacing the toggled device 56 upwardly, as by hydraulic means, not shown, or other devices known in the art, the struts 58 connected to the toggle device and the cover member 3' move the sides 3'a, 3'b of the cover member into the horizontal position shown by the chain lines.

In this embodiment, side wall members or wind control walls 6 are made of a hingedly connected 6a panels similar to those in FIGS. 1a and 1b. The outer ends of the panels 6a are slidably fixed within vertical guides 50 located at the ends of the walls 6. Hydraulic piston cylinders 52 and extendible arms 54 move the outer ends of the panels 6a within the guides 50 to the desired positions for regulating the flow of air through the space between the roof 1' and the raised cover member 3'.

Figure 3:
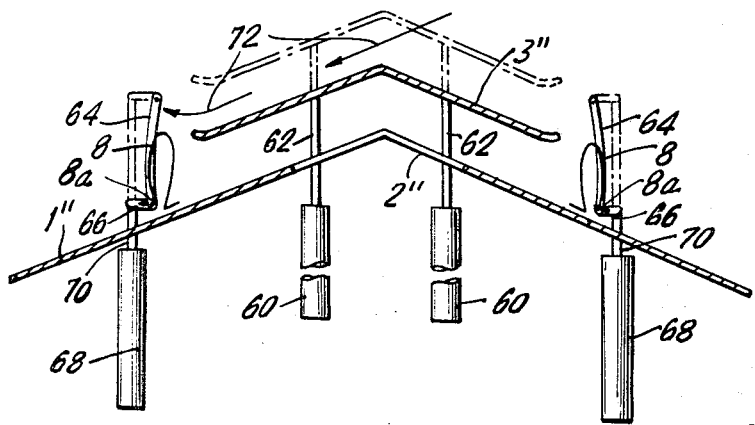
FIG. 3 is a view similar to FIG. 2 of still another embodiment of the invention.

In the embodiment of the invention shown in FIG. 3 the cover member 3" is upwardly displaceable from the roof 1" for uncovering the opening 2" by means of hydraulic piston cylinders 60 and extendible arms 62 similar to the previously described arrangements. Side wall members 8 are mounted on the roof 1" outwardly from the opening 2" and are made of a flexible material such as rubber, plastic or the like. Guide frames 64 extend upwardly from the roof 1" at each end of the wall members 8. The free ends 8a of the wall members 8 are secured to a support member 66 which is slidably fixed within the guide frames 64. The support member 66 and the wall member 8 are movable vertically by means of hydraulic piston cylinders 68 and extendible arms 70 secured to the support member at the guide frames 64. By selectively positioning the cover member 3" and the side-wall members 8 the flow of air through the opening 2" can be regulated.

In FIG. 3 the edges of the cover member 3" are curved upwardly for deflecting the wind upwardly, in the direction indicated by the arrows 72.

As an alternative to the arrangement shown in FIG. 3, the side wall member 8 may be secured to a spring biased roll for maintaining the side wall member in a down position except when raised upwardly by the hydraulic piston device.

It will be appreciated that the invention is directed primarily to the selective positioning, either individually or jointly, of the cover member and the side wall members. The various means illustrated for positioning the cover member and the side wall members are set forth, by way of example, and are not intended to exclude the various means known in the art for movably locating these members.

The cover member and the opening in the roof may be either curvilinear or rectilinear and the means for moving the cover member and the side wall members can be easily adapted to either shape.

While specific embodiments of the invention have been shown and described in detail to illustrate the application of the inventive principles, it will be understood that the invention may be embodied otherwise without departing from such principles.

What is claimed is:

1. A venting structure for a roof and the like, comprising a roof having an opening therein, a cover element for closing the opening in said roof, means for moving said cover element away from and toward said roof for opening and closing the opening therein and forming a space between said roof and cover element for passage of air therethrough, side wall forming means located on said roof adjacent the opening therein, means for selectively extending said side wall forming means from said roof for selectively positioning said side wall forming means as a shield for the space between said roof and cover element for varying the ventilating conditions therethrough in relation to wind conditions, ventilating requirements and the like.

2. A venting structure as set forth in claim 1, wherein said means for moving said cover element and said means for extending said side wall forming means are arranged to operate together.

3. A venting structure as set forth in claim 1, wherein said side wall forming means are secured to said roof and are extendible therefrom independently of said means for moving said cover element.

4. A venting structure as set forth in claim 3, wherein said side wall forming means are spaced from said opening and are extendible upwardly from said roof.

5. A venting structure as set forth in claim 4, wherein said side wall forming means are disposed on at least two opposite sides of the opening in said roof.

6. A venting structure as set forth in claim 5, wherein said side wall means are formed of a plurality of panels articulated together to form a shield when extended upwardly from said roof.

7. A venting structure as set forth in claim 5, wherein said side wall forming means are formed of a flexible member extendible between a collapsed position and an extended position.

8. A venting structure as set forth in claim 7, wherein said flexible member is disposed in at least a partly rolled configuration in its collapsed position and is extendible therefrom into its extended position.

9. A venting structure as set forth in claim 1, wherein said means for moving said cover element comprises at least one upright support member secured to said cover member, and a device for moving said upright member and cover element upwardly from said roof.

10. A venting structure as set forth in claim 9, wherein said means for moving said cover element comprises at least one upright member, said cover elements hingedly attached to the upper end of said upright member, and support members attached to said upright member and said cover member, whereby said support members are movably positionable along said upright member for urging said cover member to pivot upwardly about upper end of said upright member.

11. A venting structure as set forth in claim 9, wherein said roof has a peak shaped configuration, the opening in said roof located at the peak portion thereof, and said cover element having a peak shaped configuration to fit on said roof and cover the opening therein.

12. A venting structure as set forth in claim 11, wherein at least one edge of said cover element is curved upwardly for forming an air deflecting surface.

References Cited

UNITED STATES PATENTS

| 396,215 | 1/1889 | Lutcher | 98—42 X |
| 2,492,242 | 12/1949 | Shaver | 98—42 |

ROBERT A. O'LEARY, *Primary Examiner.*

W. E. WAYNER, *Assistant Examiner.*